United States Patent
Di Pietro et al.

(10) Patent No.: US 12,177,335 B2
(45) Date of Patent: Dec. 24, 2024

(54) POWER LINE COMMUNICATION CHANNEL IMPULSE RESPONSE MULTILEVEL QUANTIZATION FOR PHYSICAL LAYER SECURITY

(71) Applicants: Qatar Foundation for Education, Science and Community Development, Doha (QA); Iberdrola QSTP LLC, Doha (QA)

(72) Inventors: Roberto Di Pietro, Doha (QA); Aymen Omri, Doha (QA); Javier Hernandez-Fernandez, Doha (QA)

(73) Assignees: QATAR FOUNDATION FOR EDUCATION, SCIENCE AND COMMUNITY DEVELOPMENT, Doha (QA); IBERDROLA QSTP LLC, Doha (QA)

( * ) Notice: Subject to any disclaimer, the term of this patent is extended or adjusted under 35 U.S.C. 154(b) by 242 days.

(21) Appl. No.: 18/093,184

(22) Filed: Jan. 4, 2023

(65) Prior Publication Data
US 2023/0216663 A1    Jul. 6, 2023

Related U.S. Application Data

(60) Provisional application No. 63/296,306, filed on Jan. 4, 2022.

(51) Int. Cl.
*H04L 9/08*    (2006.01)
*H04B 3/54*    (2006.01)
(Continued)

(52) U.S. Cl.
CPC ............ *H04L 9/0825* (2013.01); *H04B 3/54* (2013.01); *H04L 9/14* (2013.01); *H04L 25/0212* (2013.01)

(58) Field of Classification Search
CPC ...... H04B 3/54; H04L 9/0825; H04L 25/0212
See application file for complete search history.

(56) References Cited

U.S. PATENT DOCUMENTS

| | | | |
|---|---|---|---|
| 9,413,423 B1* | 8/2016 | Pande | H04L 1/20 |
| 2007/0165845 A1* | 7/2007 | Ye | H04L 9/0875 380/30 |

OTHER PUBLICATIONS

M. Bulenok, I. Tunaru, L. Biard, B. Denis and B. Uguen, "Experimental channel-based secret key generation with integrated ultra wideband devices," 2016 IEEE 27th Annual International Symposium on Personal, Indoor, and Mobile Radio Communications (PIMRC), Valencia, Spain, 2016, pp. 1-6 (Year: 2016).*

(Continued)

*Primary Examiner* — Vance M Little
(74) *Attorney, Agent, or Firm* — K&L Gates LLP

(57) ABSTRACT

A multilevel power line communication quantization method for physical layer security is provided. The multilevel quantization method includes generating an estimated channel impulse response of at least one link between a first node and a second node; performing a quantization of the estimated channel impulse response; generating a virtual channel impulse response; performing a quantization of the virtual channel impulse response for generating a first key and a second key, wherein the first key has a corresponding first position vector and the second key has a corresponding second position vector; and confirming that the first key and the second key are equal.

20 Claims, 7 Drawing Sheets

(51) Int. Cl.
  *H04L 9/14* (2006.01)
  *H04L 25/02* (2006.01)

(56) References Cited

OTHER PUBLICATIONS

J. Han, X. Zeng, X. Xue and J. Ma, "Physical Layer Secret Key Generation Based on Autoencoder for Weakly Correlated Channels," 2020 IEEE/CIC International Conference on Communications in China (ICCC), Chongqing, China, 2020, pp. 1220-1225 (Year: 2020).*
P. Walther, E. Franz and T. Strufe, "Blind Synchronization of Channel Impulse Responses for Channel Reciprocity-based Key Generation," 2019 IEEE 44th Conference on Local Computer Networks (LCN), Osnabrueck, Germany, 2019, pp. 76-83 (Year: 2019).*
Hamida, et al.; "An Adaptive Quantization Algorithm for Secret Key Generation Using Radio Channel Measurements"; 2009; 3rd International Conference on New Technologies Mobility and Security; (3 pages).
Liu, et al.; "A two dimensional quantization algorithm for CIR-based physical layer authentication"; 2013; IEEE International Conference on Communications (ICC); (3 pages).
Passerini, et al.; "Secure PHY Layer Key Generation in the Asymmetric Power Line Communication Channel"; Apr. 2, 2020; www.mdpi.com/journal/electronics; (21 pages).
Yang, et al.; PowerKey: Generating Secret Keys from Power Line Electromagnetic Interferences; Dec. 19, 2020; (15 pages).

* cited by examiner

1: Inputs: Key Length: $k_{Len}$.
2:     CIR Estimates: $CIRe$.
3:     One level Quantization Threshold: $L1$.
4:     Multilevel Quantization Thresholds:
5:     $L- = -1$ and $L+ = +1$.
6:     Multilevel Quantization Step: $\alpha$.
7:     $m = 1$.
8: Step 1: $CIRe$ Magnitude One level Quantization:
9: for $n$ from 1 to $k_{Len}$ do
10:    if $(|CIRe(n)| \leq L1)$ then
11:       $k0(n) = 1$
12:    else
13:       $k0(n) = 0$
14:    end if
15: end for
16: Step 2: Virtual CIR (VCIR) Generation:
17: $Part1 = k0(1 : k_{Len}/2)$
18: $Part2 = k0(k_{Len}/2 + 1 : k_{Len})$
19: Generating the $VCIR$, according to Table II.
20: Step 3: VCIR Multilevel Quantization
21: while $(m < k_{Len}/2)$ and $(L+ \neq L-)$ do
22:    for $n$ from 1 to $k_{Len}/2$ do
23:       if $(VCIR(n) \geq L+)$ then
24:          $key(m) = 1$
25:          $Pos(m) = n$
26:          $m = m + 1$
27:       end if
28:       if $(VCIR(n) \leq L-)$ then
29:          $key(m) = 0$
30:          $Pos(m) = n$
31:          $m = m + 1$
32:       end if
33:    end for
34:    $L+ = (L+) - \alpha$
35:    $L- = (L-) + \alpha$
36: end while

Figure 1

Step 1: *CIRe* One level Quantization:
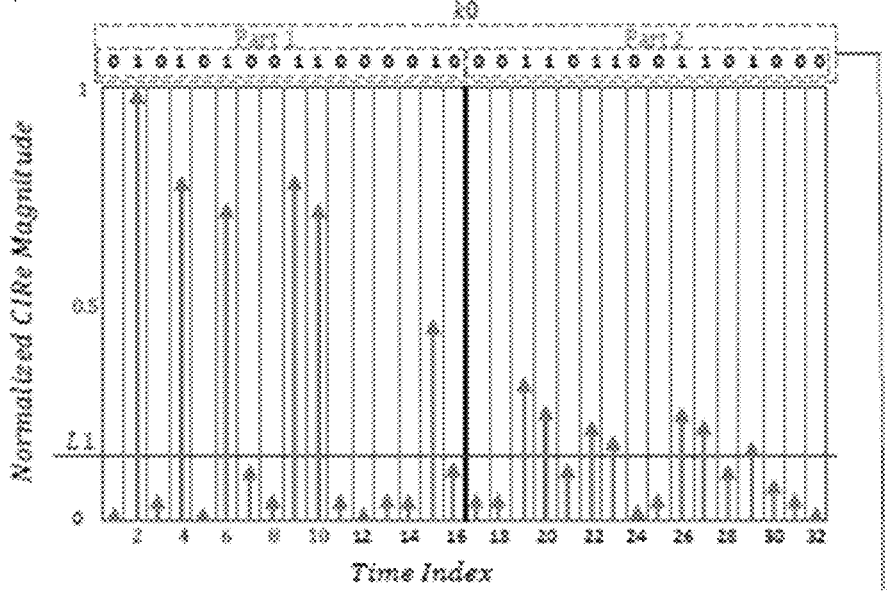
Step 2: *VCIR* Generation:
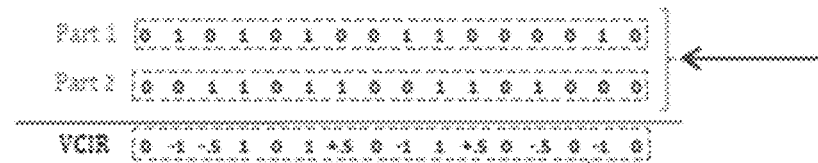
Step 3: *VCIR* Multilevel Quantization:
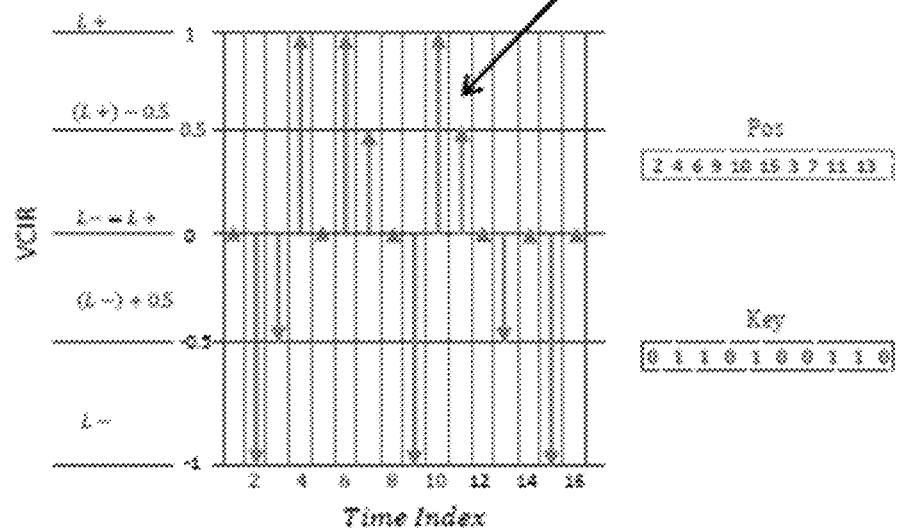
Figure 2

$Key_{A\_B} =$
[0110010101001011000000100110100000000010010]

$Pos_{A\_B} =$ [12 21 24 26 30 33 35 36 38 39 42 44 45 46 47
48 50 51 53 54 55 56 57 58 59 60 62 63 1 3
4 6 7 8 9 11 13 15 16 18 19 22 27 29 37 41]

$Key_{B\_A} =$
[0110010101101011000000100110100000000000010]

$Pos_{B\_A} =$ [12 21 24 26 30 33 35 36 38 39 42 44 45 46 47
48 50 51 53 54 55 56 57 58 59 60 62 63 1 3
4 6 7 8 9 11 13 15 16 19 27 29 37 41]

$Key_{A\_B} =$
[0110010101001011000000100110100000000000010]
$Key_{B\_A} =$
[0110010101101011000000100110100000000000010]

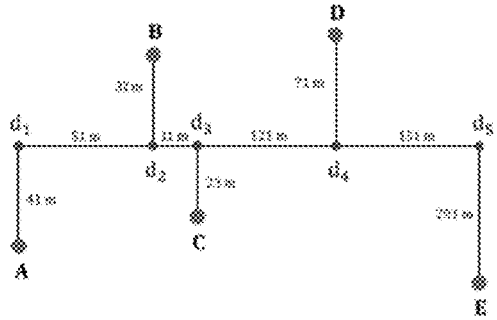
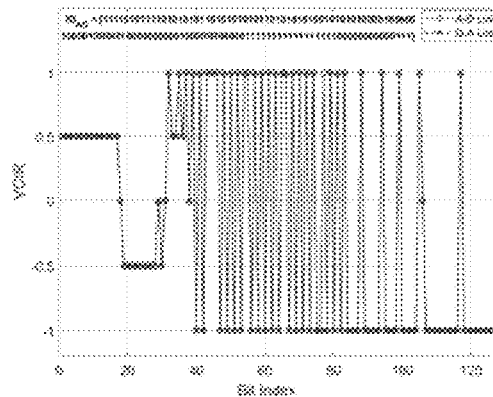

(a) Bus topology scenario (b) The VCIR of $(A \leftrightarrow D)$ links and its generated ID/Key

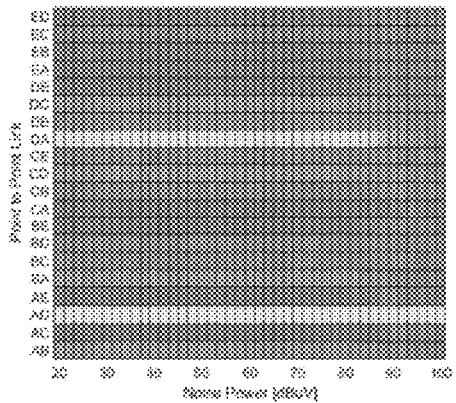
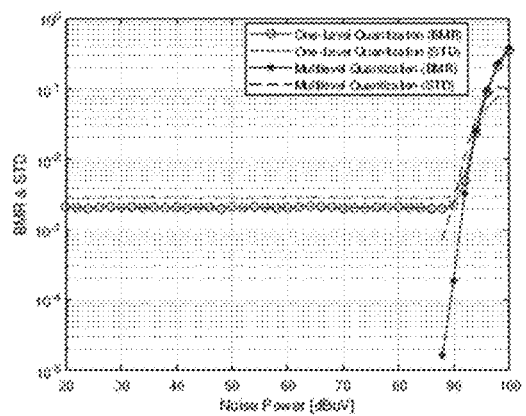

(c) The 2D correlation coefficients display between the $(A \rightarrow D)$ link ID (Identification) and the different link IDs (d) BMR result after applying reconciliation techniques on $(A \leftrightarrow D)$ when compared with single-level quantization

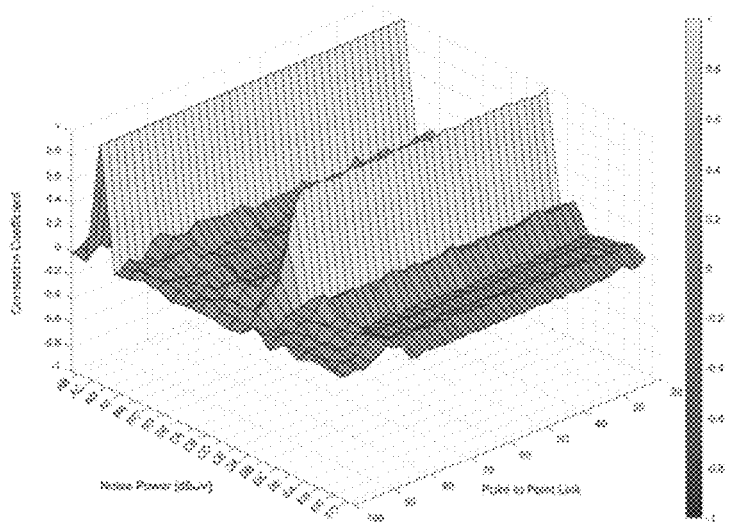

(e) 3D Projection of the correlation coefficients matrix in (c)

Figure 6

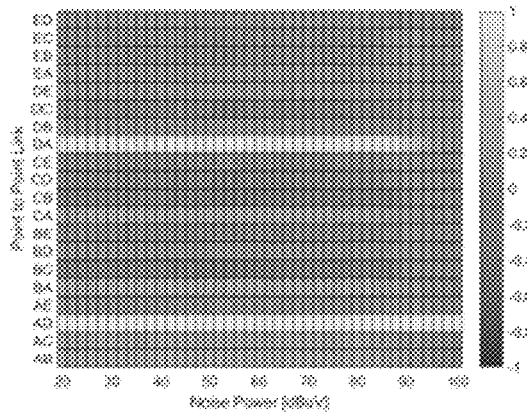
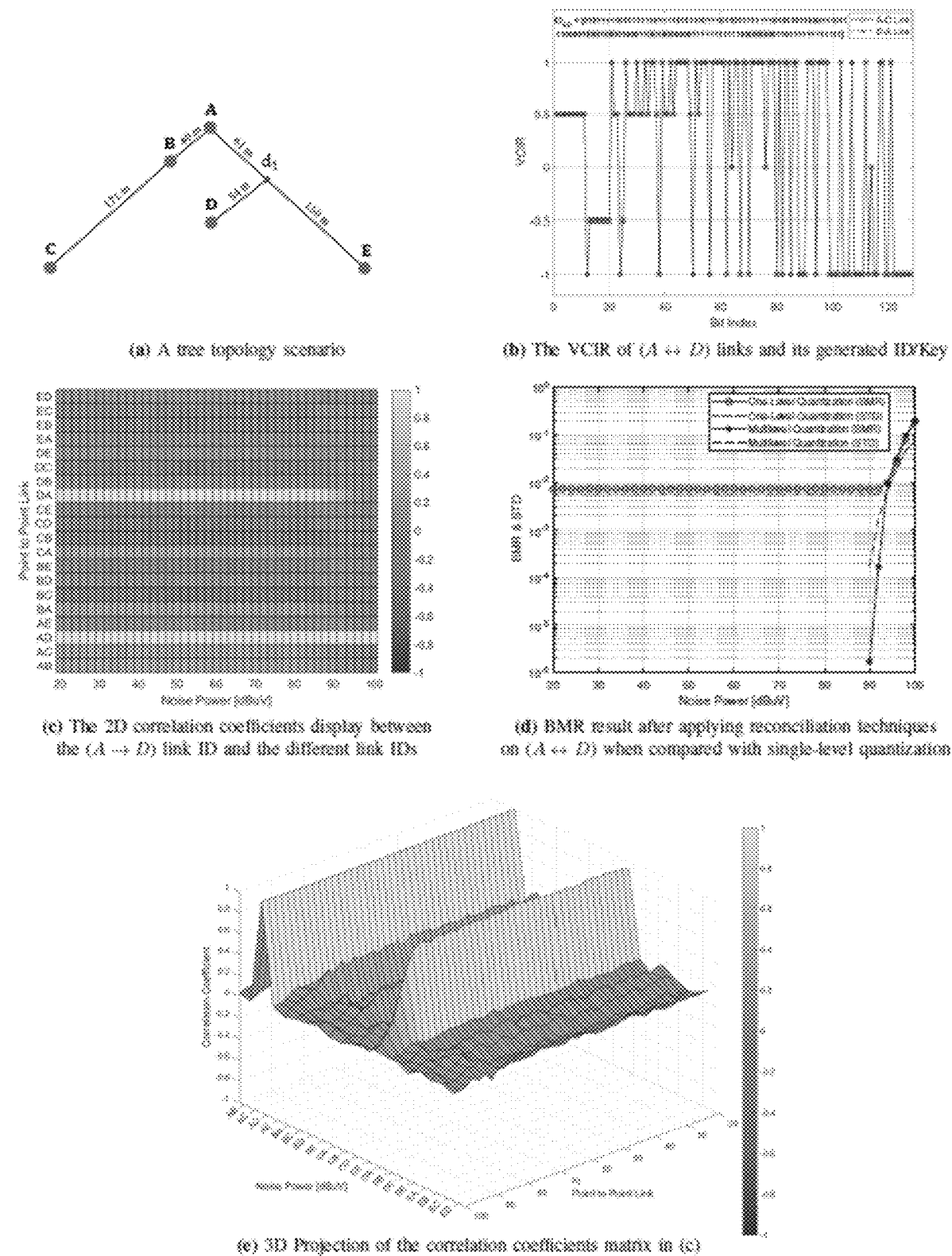
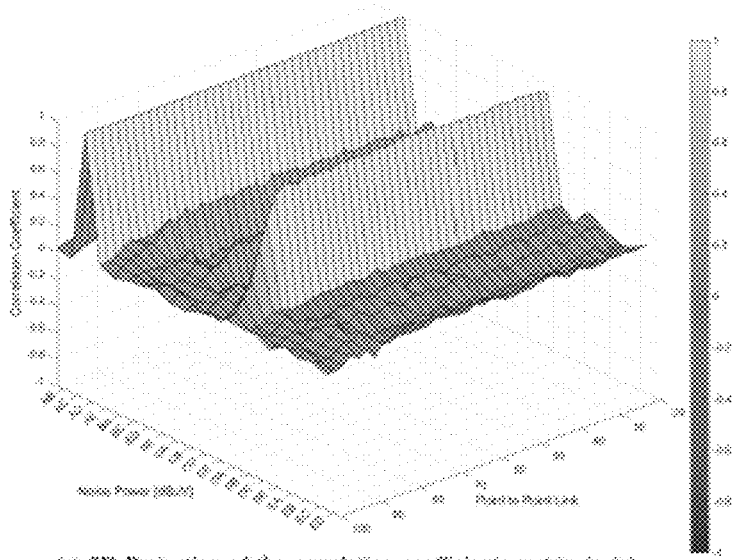
Figure 7

POWER LINE COMMUNICATION CHANNEL IMPULSE RESPONSE MULTILEVEL QUANTIZATION FOR PHYSICAL LAYER SECURITY

CROSS-REFERENCES TO RELATED APPLICATIONS

The present disclosure claims priority to U.S. Provisional Patent Application 63/296,306 titled "Power Line Communication CIR Multilevel Quantization for Physical Layer Security" having a filing date of Jan. 4, 2022, the entirety of which is incorporated herein.

BACKGROUND

Smart grids are currently one of the critical topics of the cybersecurity domain. Generally, the infrastructure needed to run a power grid typically has little to no physical security and constitutes a vulnerable access point. For example, in distribution transformer stations, regardless of the type, access to the equipment that operates the grid is usually only protected by a simple lock on a cabinet. Other network components, such as overhead lines and smart meters, are easily accessible, becoming an easy target for malicious users. In-home or in-building power cables suffer from the problem of being easily accessible with unmonitored outlets. Because the number of installed power line communication ("PLC") devices has grown exponentially in the past years, physical layer security ("PLS") mechanisms are needed for increased protection.

SUMMARY

The present disclosure generally relates to a multilevel power line communication quantization method for physical layer security.

In light of the present disclosure, and without limiting the scope of the disclosure in any way, in an aspect of the present disclosure, which may be combined with any other aspect listed herein unless specified otherwise, a multilevel power line communication quantization method for physical layer security is provided.

In an aspect of the present disclosure, which may be combined with any other aspect listed herein unless specified otherwise, the multilevel power line quantization method includes generating an estimated channel impulse response of at least one link between a first node and a second node; performing a quantization of the estimated channel impulse response; generating a virtual channel impulse response; performing a quantization of the virtual channel impulse response for generating a first key and a second key, wherein the first key has a corresponding first position vector and the second key has a corresponding second position vector; and confirming that the first key and the second key are equal.

In an aspect of the present disclosure, which may be combined with any other aspect listed herein unless specified otherwise, the estimated channel impulse response is asymmetric.

In an aspect of the present disclosure, which may be combined with any other aspect listed herein unless specified otherwise, the virtual channel impulse response is symmetric.

In an aspect of the present disclosure, which may be combined with any other aspect listed herein unless specified otherwise, generating a virtual channel impulse response comprises converting the asymmetric estimated channel impulse response to the symmetric virtual channel impulse response.

In an aspect of the present disclosure, which may be combined with any other aspect listed herein unless specified otherwise, performing the quantization of the estimated channel impulse response provides an initial key vector having an initial key length.

In an aspect of the present disclosure, which may be combined with any other aspect listed herein unless specified otherwise, generating the virtual channel impulse response includes dividing the initial key vector into a first part and a second part, and processing the first part and the second part.

In an aspect of the present disclosure, which may be combined with any other aspect listed herein unless specified otherwise, generating the estimated channel impulse response includes estimating a channel frequency response, and converting the channel frequency response into the estimated channel impulse response.

In an aspect of the present disclosure, which may be combined with any other aspect listed herein unless specified otherwise, the channel frequency response is estimated using predefined pilots and interpolation methods and the channel frequency response is converted into the estimated channel impulse response using an inverse discrete Fourier transform.

In an aspect of the present disclosure, which may be combined with any other aspect listed herein unless specified otherwise, a multilevel power line channel impulse response quantization method for physical layer security, includes: generating an estimated channel impulse response of at least one link between a first communicating node and a second communicating node; converting the estimated channel impulse response to a virtual channel impulse response including: performing a quantization of the estimated channel impulse response; generating the virtual channel impulse response; performing a quantization of the virtual channel impulse response for generating a first key and a second key, wherein the first key has a corresponding first position vector and the second key has a corresponding second position vector; and confirming that the first key and the second key are equal.

In an aspect of the present disclosure, which may be combined with any other aspect listed herein unless specified otherwise, performing the quantization of the estimated channel impulse response provides an initial key vector having an initial key length.

In an aspect of the present disclosure, which may be combined with any other aspect listed herein unless specified otherwise, generating the virtual channel impulse response includes: dividing the initial key vector into a first part and a second part; and processing the first part and the second part.

In an aspect of the present disclosure, which may be combined with any other aspect listed herein unless specified otherwise, generating the estimated channel impulse response includes: estimating a channel frequency response; and converting the channel frequency response into the estimated channel impulse response.

In an aspect of the present disclosure, which may be combined with any other aspect listed herein unless specified otherwise, the channel frequency response is estimated using predefined pilots and interpolation methods and the channel frequency response is converted into the estimated channel impulse response using an inverse discrete Fourier transform.

In an aspect of the present disclosure, which may be combined with any other aspect listed herein unless specified otherwise, a system for multilevel power line channel impulse response quantization for physical layer security includes a processor storing a plurality of instructions, which, when executed by the processor, cause the processor to: generate an estimated channel impulse response of at least one link between a first node and a second node; perform a quantization of the estimated channel impulse response; generate a virtual channel impulse response; perform a quantization of the virtual channel impulse response for generating a first key and a second key, wherein the first key has a corresponding first position vector and the second key has a corresponding second position vector; and confirm that the first key and the second key are equal.

In an aspect of the present disclosure, which may be combined with any other aspect listed herein unless specified otherwise, the estimated channel impulse response is asymmetric.

In an aspect of the present disclosure, which may be combined with any other aspect listed herein unless specified otherwise, the virtual channel impulse response is symmetric.

In an aspect of the present disclosure, which may be combined with any other aspect listed herein unless specified otherwise, generating a virtual channel impulse response includes converting the asymmetric estimated channel impulse response to the symmetric virtual channel impulse response.

In an aspect of the present disclosure, which may be combined with any other aspect listed herein unless specified otherwise, performing the quantization of the estimated channel impulse response provides an initial key vector having an initial key length.

In an aspect of the present disclosure, which may be combined with any other aspect listed herein unless specified otherwise, generating the virtual channel impulse response incudes: dividing the initial key vector into a first part and a second part; and processing the first part and the second part.

In an aspect of the present disclosure, which may be combined with any other aspect listed herein unless specified otherwise, generating the estimated channel impulse response includes: estimating a channel frequency response; and converting the channel frequency response into the estimated channel impulse response.

The reader will appreciate the foregoing details, as well as others, upon considering the following detailed description of certain non-limiting embodiments including a multilevel power line communication quantization method for physical layer security.

BRIEF DESCRIPTION OF THE DRAWINGS

The accompanying figures depict various elements of the one or more embodiments of the present disclosure, and are not considered limiting of the scope of the present disclosure.

In the Figures, some elements may be shown not to scale with other elements so as to more clearly show the details. Additionally, like reference numbers are used, where possible, to indicate like elements throughout the several Figures.

FIG. 1 illustrates an example embodiment of a multilevel quantization method, according to embodiments of the present disclosure.

FIG. 2 illustrates an example embodiment of a portion of a multilevel quantization method, according to embodiments of the present disclosure.

FIG. 6 illustrates an example simulation, including views (a) to (e), corresponding to: (a) the bus topology, (b) the virtual channel impulse response of (A↔D) links and generated keys, (c) the 2-dimensional correlation coefficients display between the (A↔D) link identification and the different link identifications, (d) the BMR result after applying reconciliation techniques on (A↔D) when compared with single-level quantization, and (e) the 3-dimensional projection of the correlation coefficients in the matrix of view (c).

FIG. 7 illustrates an example simulation, including views (a) to (e), corresponding to: (a) the tree topology, (b) the virtual channel impulse response of (A↔D) links and generated keys, (c) the 2-dimensional correlation coefficients display between the (A↔D) link identification and the different link identifications, (d) the BMR result after applying reconciliation techniques on (A↔D) when compared with single-level quantization, and (e) the 3-dimensional projection of the correlation coefficients in the matrix of view (c).

DETAILED DESCRIPTION

Figures 3, 4, 5:
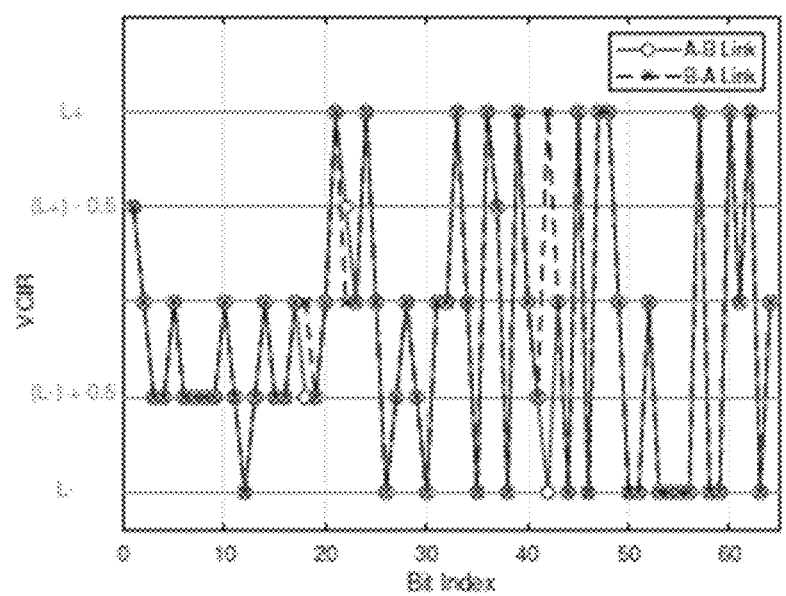
FIG. 3 illustrates an example output of a multilevel quantization method, according to embodiments of the present disclosure.
FIG. 4 illustrates an example updated output of a multilevel quantization method, according to embodiments of the present disclosure.
FIG. 5 illustrates an example virtual channel impulse response of a multilevel quantization method, according to embodiments of the present disclosure.

The present disclosure generally relates to a multilevel power line communication quantization method for physical layer security.

Current PLC technologies are classified based on the whether they use broadband PLC ("BB-PLC"), using the frequency range from 1.8 MHz to 250 MHz, or narrowband PLC ("NB-PLC"), operating from 3 kHz to 500 kHz. Examples of PLC standards include include PRIME, G3-PLC, G·hnem NB-PLC, and G·hn or HomePlug AV2 for BB-PLC. However, regardless of the final application, the cited protocols share two features: (1) orthogonal frequency division multiplexing ("OFDM") is used as a waveform scheme and (2) the security of communications is based on the same mechanisms, public key infrastructure ("PKI") and the symmetric key based Advanced Encryption Standard ("AES") block cipher.

The PLC and wireless mediums are frequency selective and involve broadcasting. This latter condition makes both media prone to eavesdropping and open to identity-based attacks. Similarly to what happens for wireless implementations, PLC can also provide a complement to traditional security schemes leveraging their idiosyncratic physical layer components. Non-cryptographic PLS mechanisms can utilize device (hardware or software) or location/channel-specific properties to secure communications. Channel properties, such as the channel state information ("CSI") and the received signal strength ("RSS"), are dependent on location and, despite some significant differences, can provide PLS solutions in both PLC and wireless communications.

According to an embodiment of the present disclosure, the multilevel quantization method may include three steps: (1) channel probing, (2) quantization, and (3) reconciliation.

In the channel probing step, an example embodiment estimates the CIR of the links between the two communicating nodes. This estimation can be done by performing two sequential processes. First, the channel frequency response ("CFR") is estimated using predefined pilots and interpolation methods or similar estimation techniques. Then, the CFR is converted to the estimated CIR using the inverse discrete Fourier transform ("IDFT").

In the quantization step, an example embodiment generates a unique key that is shared between two communicating devices. The quantization step may further include three sub-steps, including (1) magnitude one level quantization, (2) virtual channel impulse response ("VCIR") generation, and (3) VCIR multilevel quantization. These three sub-steps are shown in an example process of FIG. 1.

In sub-step 1, magnitude one level quantization is executed, which estimates the channel impulse rate ("CIR"). The estimated CIR ($CIR_e$) is later used to generate an initial key (k0) of length $k_{Len}$.

In sub-step 2, the VCIR is generated by dividing the vector k0 into Part1 and Part2. Part1 and Part2 are then provided as inputs to Table I, which iterate through each position to obtain a final key, the VCIR, composed by half of the elements of the initial key k0.

TABLE I

The Virtual CIR Generation Table for n ∈ {1, 2, . . . , $k_{Len}/2$}

| Part1(n) | Part2(n) | VCIR(n) |
|---|---|---|
| 1 | 1 | 1 |
| 1 | 0 | −1 |
| 0 | 1 | −0.5 if VCIR(n − 1) ≤ 0 |
|   |   | +0.5 if VCIR(n − 1) > 0 |
| 0 | 0 | 0 |

In sub-step 3, the method executes VCIR quantization. Namely, the method scans the VCIR sequence to detect which samples n cross or equal the thresholds L− and L+. This step is repeated, with an adjustment in the upper and lower levels, until the generated key length equals $k_{Len}/2=2$ or L−=L+. During this process, each peak detection is added to a position vector, and its level used to generate a key by converting it to the corresponding one or zero. Thus, once complete, keys are generated with the corresponding position vectors. FIG. 2 is a walk-though example embodiment for the three sub-steps of the quantization step.

In the reconciliation step, an example embodiment confirms that the generated keys ($key_{A-B}$ and $key_{B-A}$) are equal. A method is executed in which node A sends the position vector ($Pos_{B-A}$) to node B. Subsequently, B compares this vector with the one that it has locally computed to find the agreement bits and generate an updated position vector that will be sent back to A. A and B then locally updated the key based on the position vector, eventually generating a shared key.

To illustrate the exposed peak position-based technique, a number of examples are used to cover three possible scenarios that could occur during the reconciliation step. Thus, a PLC simulator was built to generate the CIR, and calculate the corresponding VCIR for different topologies and network parameters. The scenario, based on the VCIR presented in FIG. 3, outputs the following initial keys and position vectors for the links (A–B) and (B–A).

As shown in the vectors of FIG. 3, some peaks are not present on both sides. For example, peaks 18 and 22. The latter ones should be discarded when generating the final key. Accordingly, the updated keys after the position vectors have been shared are shown in FIG. 4. Even with this signaling procedure, A and B could detect two peaks at the same position with different levels. For instance, the detected peak at position 42 in FIG. 3, would result in a bit mismatch of the two keys. For these cases, some techniques, where A should generate a random number R, encrypt it with its new key, and send a message to B. Then, B should decrypt the received message, perform an arithmetic addition of one, and encrypt the result. The new key is then sent back to A. Finally, A will try to decrypt the received message. If the result is equal to R+1, then A will send a key agreement acknowledgment to B. Otherwise, the key is discarded, and the key generation process is restarted.

To evaluate the multilevel quantization method for power line communication physical layer security, a simulator was developed. The simulator consists of the following main functions: (1) topology simulation, (2) virtual channel impulse response generation, (3) reconciliation, (4) bit mismatch rate, and (5) correlation calculation.

The PLC channel path delays depend only on network topology. However, the channel path delays can be altered during the channel estimation phase when trying to distinguish between signal and noise. Accordingly, the topology simulation function considers the branches, transmission distances, discontinuities, the number of nodes, and cable joins that affect the channel path delays. Within the simulator, the topology simulation function focused on three topologies covering the most common medium voltage and low voltage scenarios. These topologies included (1) the bus topology, (2) the tree topology, and (3) the star topology.

While the bus topology and the tree topology characterize typical distribution networks where secondary lines connecting end nodes are attached to the main cable, the star topology is intended to analyze direct and clean connections without discontinuities. Once the topology is selected, a PLC time-domain model is used to simulate the selected topology and generate the corresponding path delays and gains. As any signal will bounce and fork at any discontinuity, terminal node, or branch, a virtually infinite number of secondary paths are generated for every communication. Therefore, this function will yield a given number of first arriving paths between two given endpoints for each topology to account for this phenomenon.

To further explain this function, one can consider an example of a simple T scenario, with end nodes (A, B, D) and a middle node (C) that connects the nodes. In the following formulas, the general distance between two given nodes X and Y is represented by $L_{XY}$; the propagation attenuation coefficient per PL length unit is represented by $\alpha$; the reflection attenuation coefficient at node X is represented by $\rho_x$; and the discontinuity coefficient at node X is represented by $\delta_x$. By considering the different attenuations, the length of the first path (A→C→B) is equal to Formula 1 and the corresponding path gain is equal to Formula 2. For the second path (A→C→D→C→B), the path length and the gain are given, respectively, by Formula 3 and Formula 4.

$$l_1 = L_{AG} + L_{cb} = L_{AB} \quad \text{Formula 1}$$

$$g_1 = (1-\alpha L_{Ac})(1-\alpha L_{cb})(1-\delta_c) \quad \text{Formula 2}$$

$$l_2 = L_{AC} + 2L_{CD} + L_{CB} \quad \text{Formula 3}$$

$$g_2 = (1-\alpha L_{AC})(1-\alpha L_{CD})^2(1-\alpha L_{CD})(1-\rho_D)(1-\delta_c)^2 \quad \text{Formula 4}$$

Then, during a predefined channel probing period, all the arriving paths are evaluated, by computing the path delays and gains. Then, the corresponding CFRs are generated. Based on that, the different CFRs are estimated using the least-squares estimation method, where the channel estimation error is inversely proportional to the corresponding link's instantaneous complex noise value. Finally, the estimated CIRs of the different links are evaluated, by converting the CFR estimates to the time domain.

As the sampling rate is directly related to the multipath detection accuracy, the sampling frequency should be adapted to the topology to avoid saturation. Dense topologies with many paths, discontinuities, short distances, or low attenuation factors, will be more prone to capture paths for each sampling time.

The VCIR generation function uses the output of the topology simulation function to evaluate the two ways that VCIRs are generated between every two endpoints following the instructions detailed in Steps 2 and 3 of FIG. 1. Reconciliation takes the position vector and key as an input and performs the reconciliation process as previously detailed. Bit Mismatch Rate, which is the difference ratio in terms of bits between the uplink and downlink IDs of a given communication link, will be computed to evaluate the difference between the single-level and multilevel quantization schemes for a given link and topology.

As the final step, the correlation coefficient between the generated ID of a given link and all other links is calculated. Under imperfect channel conditions, the CIR observations are estimated but not error-free. Channel probing is subject to Gaussian and impulsive noises that will affect the reciprocity of the outcome of the quantization scheme by adding or removing some impulses. Simulations have been computed to account for this phenomenon, adding different noise levels and accounting for different instantaneous complex noise values at the nodes. The script has been designed to iterate for a given number of iterations, $N_{max}$, for each given noise power value, recording the resulting BMR and correlation coefficients. The values were then averaged for each noise power level, to generate the presented simulation results.

Accordingly, and without loss of generality, the used simulation parameters were set as follows: $N_{max}=10^6$, the average noise power ranged from 20 dBuV to 100 dBuV in steps of 2 dBuV, the sampling time was equal to $T_s=0.05$ us and the quantization level set to L1=0.02. The PL propagation attenuation used was $\alpha=-30$ dB/m, with a reflection attenuation of $\rho=-20$ dB and a discontinuity attenuation $\delta=-10$ dB. The transmit power was set to be 126 dBuV, the maximum ID length was equal to 128, and the channel probing period was equal to $2\times128\times T_s$, in order to cover the detection period of the two CIR parts.

Figure 8:
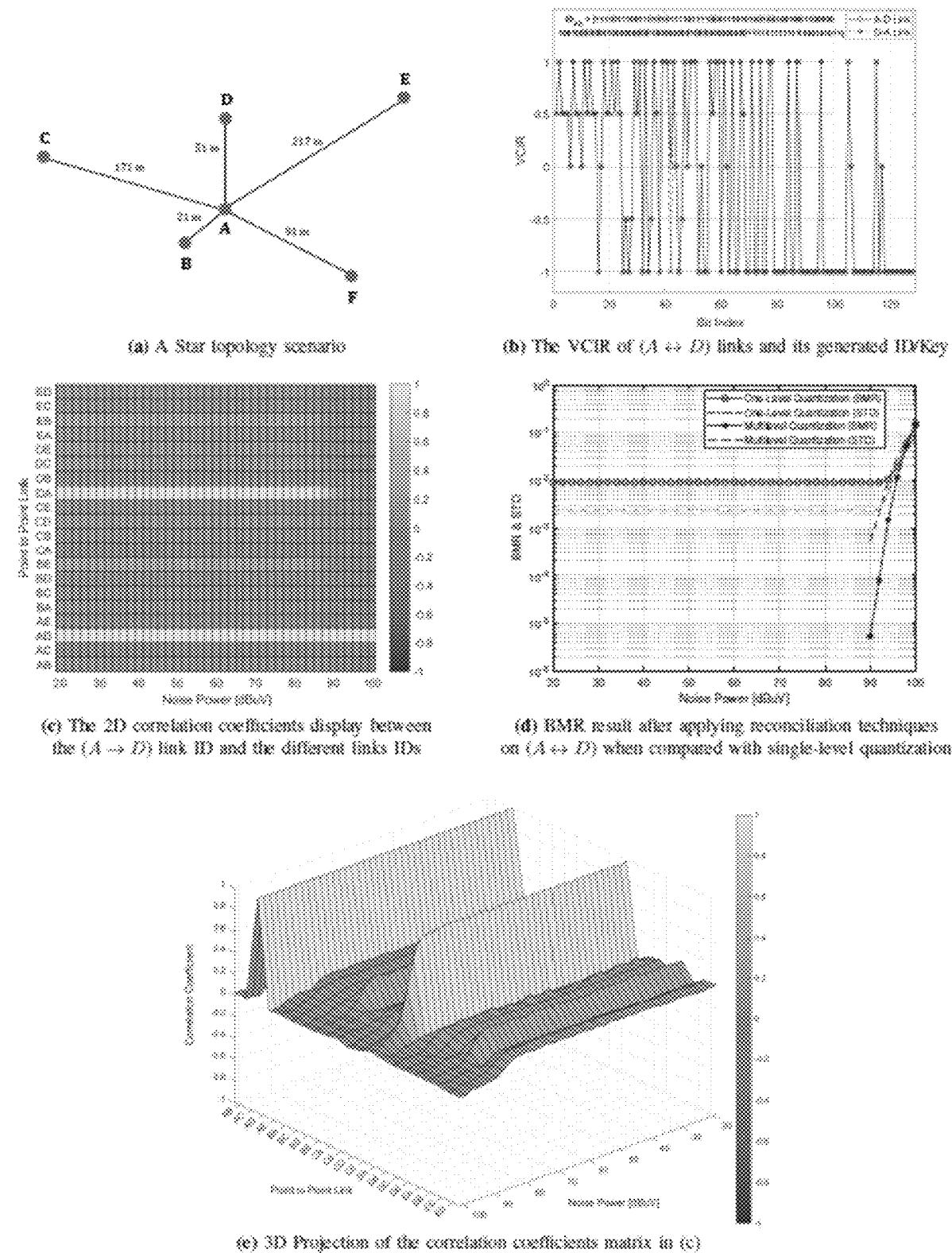
FIG. 8 illustrates an example simulation, including views (a) to (e), corresponding to: (a) the star topology, (b) the virtual channel impulse response of (A↔D) links and generated keys, (c) the 2-dimensional correlation coefficients display between the (A↔D) link identification and the different link identifications, (d) the BMR result after applying reconciliation techniques on (A↔D) when compared with single-level quantization, and (e) the 3-dimensional projection of the correlation coefficients in the matrix of view (c).

To evaluate the uniqueness of the keys, the correlation coefficients between all links under different topologies and noise levels was computed. FIGS. 6, 7, and 8 show the simulation results, which are structured as follows: (a) the considered topology is presented; (b) the VCIR multilevel quantization of the links (A↔D) is graphed, and the final generated key for the (A→D) link after the reconciliation procedure; (c) the two-dimensional (2D) correlation coefficients display between the (A→D) link and all other possible links for the selected range of possible noise levels; (d) the BMR of the (A↔D) links is presented; and (e) the corresponding three-dimensional graphical projection of the correlation matrix.

In FIGS. 6 to 8, the reciprocity between the (A↔D) links shows a clear positive correlation for all cases. The star topology registers a higher correlation between the (A→D) link and the other links, while the bus topology shows correlations below 0.2 for most links. The results for the star topology are justified taking into consideration the direct connections, shorter distances, and lack of discontinuities of the start topology, revealing a general spatial correlation between all links.

Figure 9:
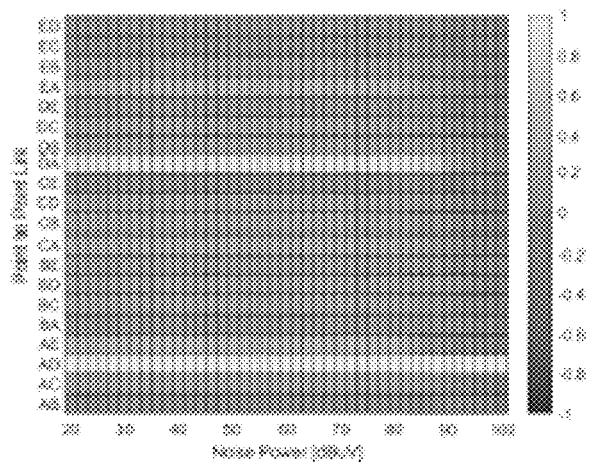
FIG. 9 illustrates an example 2-dimensional correlation coefficient display between the (A↔D) link identification and the different link identification of topology of 8(*a*) with modified distances (x2).

The alternative star-topology scenario was simulated to test the above introduced trends, duplicating the distances between all nodes, and chose to leave all the other parameters unchanged to keep the proportionality of the topology. The results, shown in FIG. 9, provide evidence that the correlation matrix is similar to the one of the initial topology, confirming the importance of the topology and keyhole effect in the correlation of impulses in PLC. The overall correlation increase with the rest of the links can be attributed to a combination of factors. Larger distances involve fewer paths detected and an increase in the time of arrival of the first impulse for all nodes, reducing, in both cases, the entropy of the CIR. The tree topology of FIG. 7 shows another example of the keyhole or pinhole effect. Links (A↔D), (A↔B) and (A↔C) share a common root node, and signals are therefore forced to pass through the same junction showing relatively high correlations. This characteristic effect of multipath propagation in PLC, provides no diversity gain due to reflections and becomes more evident in tree structures.

As expected, and for all cases, the correlation coefficients between the different links decrease with increasing noise power levels. This phenomenon occurs due to the direct relationship between the CIR observations during the channel probing and the noise: if the noise power increases, the CIR error increases. Hence, the VCIR accuracy decreases, resulting in a noisy key that reflects the uncorrelated noise variation and not the PLC CIR. In general, and independently from any topological consideration, channel estimation errors become prevalent over high noises, with a consequent disruption of the communication channel. The simulations show that this threshold is situated at approximately 90 dBuV, for all cases. The bus topology presents a slighter lower tolerance due to the higher distances (attenuation) between the A and D nodes.

The BMR comparison between both quantization schemes shows considerable differences. While the minimum BMR for the one-level quantization exhibits values above $10^{-3}$, with constant performance below 90 dBuV, our proposed scheme obtains null values for the same noise power range. The difference can be attributed to the reduction of bit mismatches performed in the reconciliation phase conducted for the multilevel quantization but not available for its one level counterpart. Another side effect of not being able to apply a reconciliation method can be seen by the fact that the BMR of the one-level quantization converges to a minimum value that cannot be reduced even with decreasing levels of noise. In this latter case, the impact of the used channel estimation technique error on the BMR is significantly higher than that of the channel estimation error due to the noise level. The reported results for noise values above 90 dBuV are similar for both quantization schemes, indicating that the impact of the channel estimation error due to high noise levels affects them equally.

From what discussed so far, the significant impact of the topology is demonstrated. In detail, modeling the effect of different network topologies, distances, and discontinuities, seems the most challenging avenue, as well as studying the influence on the density of items in the system. Other topics, such as security amplification techniques, especially tailored for the PLC scenario, could improve the keys' entropy, making this the method a solution of choice for cryptographic applications.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

We claim:

1. A multilevel power line quantization method, comprising:
    generating an estimated channel impulse response of at least one link between a first node and a second node;
    performing a quantization of the estimated channel impulse response;
    generating a virtual channel impulse response;
    performing a quantization of the virtual channel impulse response for generating a first key and a second key, wherein the first key has a corresponding first position vector and the second key has a corresponding second position vector; and
    confirming that the first key and the second key are equal.

2. The multilevel power line quantization method of claim 1, wherein the estimated channel impulse response is asymmetric.

3. The multilevel power line quantization method of claim 2, wherein the virtual channel impulse response is symmetric.

4. The multilevel power line quantization method of claim 3, wherein generating a virtual channel impulse response comprises converting the asymmetric estimated channel impulse response to the symmetric virtual channel impulse response.

5. The multilevel power line quantization method of claim 1, wherein performing the quantization of the estimated channel impulse response provides an initial key vector having an initial key length.

6. The multilevel power line quantization method of claim 5, wherein generating the virtual channel impulse response comprises:
    dividing the initial key vector into a first part and a second part; and
    processing the first part and the second part.

7. The multilevel power line quantization method of claim 1, wherein generating the estimated channel impulse response comprises:
    estimating a channel frequency response; and
    converting the channel frequency response into the estimated channel impulse response.

8. The multilevel power line quantization method of claim 7, wherein the channel frequency response is estimated using predefined pilots and interpolation methods and the channel frequency response is converted into the estimated channel impulse response using an inverse discrete Fourier transform.

9. A multilevel power line channel impulse response quantization method for physical layer security, comprising:
    generating an estimated channel impulse response of at least one link between a first communicating node and a second communicating node;
    converting the estimated channel impulse response to a virtual channel impulse response comprising:
        performing a quantization of the estimated channel impulse response;
        generating the virtual channel impulse response;
        performing a quantization of the virtual channel impulse response for generating a first key and a second key, wherein the first key has a corresponding first position vector and the second key has a corresponding second position vector; and
    confirming that the first key and the second key are equal.

10. The multilevel power line channel impulse response quantization method for physical layer security of claim 9, wherein performing the quantization of the estimated channel impulse response provides an initial key vector having an initial key length.

11. The multilevel power line channel impulse response quantization method for physical layer security of claim 10, wherein generating the virtual channel impulse response comprises:
    dividing the initial key vector into a first part and a second part; and
    processing the first part and the second part.

12. The multilevel power line channel impulse response quantization method for physical layer security of claim 9, wherein generating the estimated channel impulse response comprises:
    estimating a channel frequency response; and
    converting the channel frequency response into the estimated channel impulse response.

13. The multilevel power line channel impulse response quantization method for physical layer security of claim 12, wherein the channel frequency response is estimated using predefined pilots and interpolation methods and the channel frequency response is converted into the estimated channel impulse response using an inverse discrete Fourier transform.

14. A system for multilevel power line channel impulse response quantization for physical layer security, comprising a processor storing a plurality of instructions, which, when executed by the processor, cause the processor to:
    generate an estimated channel impulse response of at least one link between a first node and a second node;

perform a quantization of the estimated channel impulse response;

generate a virtual channel impulse response;

perform a quantization of the virtual channel impulse response for generating a first key and a second key, wherein the first key has a corresponding first position vector and the second key has a corresponding second position vector; and confirm that the first key and the second key are equal.

15. The system for multilevel power line channel impulse response quantization of claim 14, wherein the estimated channel impulse response is asymmetric.

16. The system for multilevel power line channel impulse response quantization of claim 15, wherein the virtual channel impulse response is symmetric.

17. The system for multilevel power line channel impulse response quantization of claim 16, wherein generating a virtual channel impulse response comprises converting the asymmetric estimated channel impulse response to the symmetric virtual channel impulse response.

18. The system for multilevel power line channel impulse response quantization of claim 14, wherein performing the quantization of the estimated channel impulse response provides an initial key vector having an initial key length.

19. The system for multilevel power line channel impulse response quantization of claim 18, wherein generating the virtual channel impulse response comprises:

dividing the initial key vector into a first part and a second part; and processing the first part and the second part.

20. The system for multilevel power line channel impulse response quantization of claim 14, wherein generating the estimated channel impulse response comprises:

estimating a channel frequency response; and converting the channel frequency response into the estimated channel impulse response.

* * * * *